United States Patent
Li et al.

(10) Patent No.: US 7,149,190 B1
(45) Date of Patent: Dec. 12, 2006

(54) MAC CHANNEL OPERATION EMPLOYABLE FOR RECEIVING ON MORE THAN ONE FORWARD LINK CHANNEL

(75) Inventors: Jun Li, Richardson, TX (US); Wen Tong, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 980 days.

(21) Appl. No.: 10/104,252

(22) Filed: Mar. 22, 2002

Related U.S. Application Data

(60) Provisional application No. 60/301,769, filed on Jun. 28, 2001.

(51) Int. Cl.
 *H04B 7/005* (2006.01)
(52) U.S. Cl. .................................... 370/278; 370/329
(58) Field of Classification Search ............... 370/335, 370/342, 338, 332, 328, 329, 252, 294, 278, 370/282; 455/434, 562; 375/130, 296, 260
See application file for complete search history.

(56) References Cited

U.S. PATENT DOCUMENTS

| 6,801,512 B1 * | 10/2004 | Cudak et al. | 370/332 |
| 6,993,006 B1 * | 1/2006 | Pankaj | 370/342 |
| 2001/0031647 A1 * | 10/2001 | Scherzer et al. | 455/562 |

* cited by examiner

*Primary Examiner*—John Pezzlo
(74) *Attorney, Agent, or Firm*—Carr LLP

(57) ABSTRACT

A method, apparatus and system for broadcasting data packets, perhaps concurrently, over multiple carriers. A carrier is selected for conveying data packets. An employment flag may be transmitted over a forward link MAC channel. QC information for a pilot channel of a given carrier is received over a reverse link MAC channel. The QC pilot channel information is then processed to determine the carrier selection for acceptable data packet transmission for a given time slot.

25 Claims, 6 Drawing Sheets

NODAL VIEW

MAC CHANNEL OPERATION EMPLOYABLE FOR RECEIVING ON MORE THAN ONE FORWARD LINK CHANNEL

PRIORITY

This Application claims priority of U.S. Provisional Application No. 60/301,769, filed on Jun. 28, 2001, entitled: "MAC Channel Operation for Receiving on More Than One Forward Link Carrier" by Jun Li and Wen Tong.

TECHNICAL FIELD

The invention relates to wireless transmissions employing multiple carriers and, more particularly, to selection of one or more carriers for transmission.

BACKGROUND

In the transmission of data packets employing spread-spectrum techniques and methodology, data throughput rates can be still further increased by transmitting the data packets intended for a particular mobile station on more than one carrier frequency spectra, perhaps concurrently. Within each of the multiple carriers, a data channel, each with its own Walsh code or codes relating to a distinguishable communication, may be employed to further increase the data throughput.

However, to further increase the number of concurrently employed Walsh codes, or other orthogonal codes, within the same carrier beyond a few may also cause the data encrypted with those same Walsh codes or other orthogonal codes to interfere with one another. The use of multiple orthogonal codes concurrently over a data channel of a single carrier actually creates more interference for each of the other orthogonal codes used on that carrier. Such interference potentially decrease or leads to less efficient data throughput.

One approach to address the interference concerns are to instead distribute the data encrypted in the orthogonal codes, (each orthogonal code corresponding to a separate communication) concurrently over distinct carriers, thereby avoiding or reducing such interferences. However, difficulties are encountered in determining which of a number of multiple carriers to employ, due to the lack of quality control (QC) information being made available by the mobile station, or by any other means, about the alternative carriers Thus, a need has arisen for a system and method that permits the transmission of data encrypted in distinct orthogonal codes, such as Walsh codes, on more than one carrier, perhaps concurrently, while overcoming the disadvantages associated with prior systems and approaches.

SUMMARY

The present invention, accordingly, provides a system, method and apparatus for transmitting distinguishable data channels, concurrently distributed over multiple carriers. In the present invention, multiple forward link carriers are selected for conveying data packets. Each forward link carrier in turn uses one or a plurality of Walsh codes to convey data packets within the forward link data channel.

In a first embodiment, pilot channel QC information is generated and transmitted by a mobile station. As the name suggests, this pilot channel QC information concerns the channel quality of the pilot channel of a given forward link carrier. The pilot channel QC information is in turn received by a base transceiver station over a control channel, such as a reverse link medium access control ("MAC") channel. The pilot channel QC information is then processed to determine which of the forward link carrier or forward link carriers are to be selected for transmission of data channels.

In a second embodiment, after a forward link carrier or forward link carriers have been selected for transmission, a data channel assignment indicia is transmitted over a forward link MAC channel, perhaps a plurality of forward link MAC channels. The data channel assignment indicia generally denotes that the associated forward link carrier has been selected to convey packet data over its data channel, plus other relevant information.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be apparent to those skilled in the art that the present invention may be practiced without such specific details. In other instances, well-known elements have been illustrated in schematic or block diagram form in order not to obscure the present invention in unnecessary detail. Additionally, for the most part, details concerning CDMA systems and the like have been omitted inasmuch as such details are not considered necessary to obtain a complete understanding of the present invention, and are considered to be within the skills of persons of ordinary skill in the relevant art.

It is further noted that, unless indicated otherwise, all functions described herein are performed by a processor such as a computer or electronic data processor in accordance with code such as computer program code, software, and/or integrated circuits that are coded to perform such functions.

Figure 1:
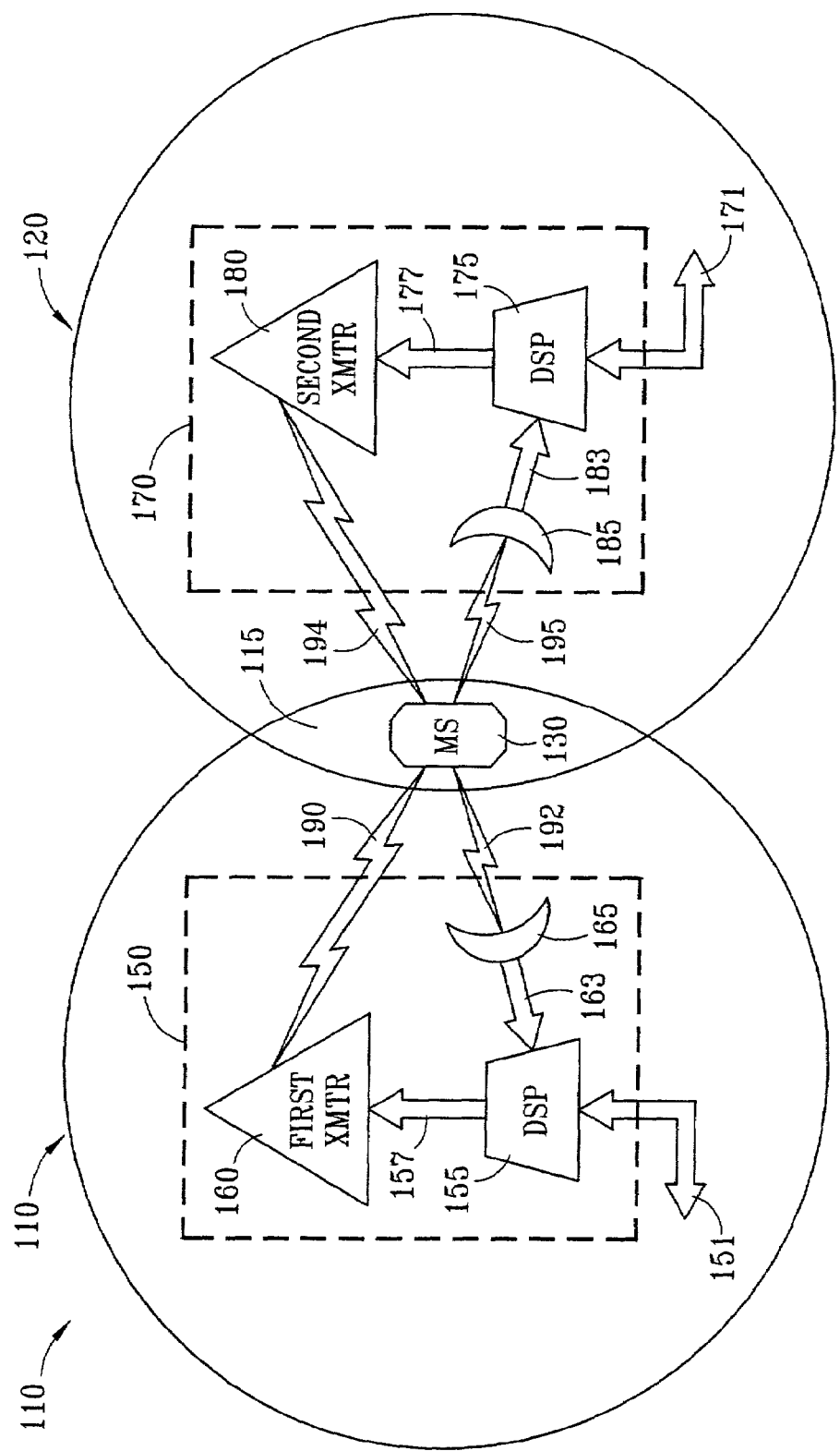
FIG. 1 illustrates a high-level schematic diagram illustrating a data packet communication system.

Turning now to FIG. 1, disclosed is a high-level schematic diagram illustrating one preferred embodiment of a data packet communication system.

A mobile station (MS) 130 is shown positioned within an area of overlapping coverage of 115 of a first and second cell, 110 and 120, respectively. The MS 130 is connected by wireless, or radio frequency (RF), link to a first base transceiver station ("BTS") 150 and a second BTS 170, respectively. The wireless communication link of the first cell 110 includes both a first forward link carrier 190 and a first reverse link carrier 192. A first forward transmitter 160 may concurrently transmit a data packet or data packets over a selected frequency carrier within the first forward link carrier 190. The first forward link carrier 190 comprises several distinct frequency carriers, each frequency carrier having its own band of the broadcast spectrum for modulating and demodulating chip sequences. The first forward link carrier 190 comprises: a forward link MAC channel, a forward link pilot channel ("pilot channel"), and one or more forward link data channels ("data channels"), each data channel associated with one or more orthogonal codes for the transmission of encrypted data. A data channel may be generally defined as the summation of all data encrypted by orthogonal codes as it is transmitted.

The wireless links of the second cell 120 include a second forward and a second reverse link carrier, 194 and 195, respectively. A second forward transmitter 180 concurrently transmits a data packet or data packets over a selected frequency carrier within the second forward link carrier 194. Like the first forward link carrier 190, the second forward link carrier 194 comprises several distinct frequency carriers, each frequency carrier having its own band of the broadcast spectrum for modulating and demodulating chip sequences. Each second forward link channel 194 similarly contains a second forward link MAC channel, a second pilot channel, and a second data channel, each data channel comprising the data encoded by one or more Walsh codes or other orthogonal codes. The second reverse link carrier 192 has contained within it a second reverse link MAC channel. As discussed above, the first forward link carrier 190 and the second forward link carrier 194 each may denote a plurality of carrier frequencies.

Information and data transmission over both the first forward link carrier 190 and the second forward link carrier 194 is generally performed using spread-spectrum techniques. The techniques and theory of spread-spectrum transmission are well known to those of skill in the art, and will not be described in further detail.

The first BTS 150 comprises a communications pathway 151, operationally connected to a digital signal processor ("DSP") 155. The communications pathway 151 may also be operationally connected to the second BTS 170, as the communications pathway 151 could be a common pathway between the first BTS 150 and the second BTS 170. The DSP 155 is further operationally connected to a forward bus 157 and then to the first forward BTS transmitter 160. The DSP 155 is also operationally connected to a reverse bus 163 and a BTS receiver 165.

Similarly, the second BTS 170 comprises both a communications pathway 171, a DSP 175, a forward bus 177 and a second forward transmitter 180, a reverse bus 183 and a BTS receiver 185. The communications pathway 171 and the DSP 175 are operationally connected. The DSP 175 of the second BTS 170 is also operationally connected to the forward bus 177 and then to the second forward transmitter 180. The DSP 175 is also operationally connected to a reverse bus 183 and a BTS receiver 185.

Although in the present illustrated embodiment, the first and second BTS 150, 170, respectively, are enabled as communicating with one another during a given communication, it is to be understood that in other preferred embodiments, the first BTS 150 will be communicating with the MS 130 by itself, coordinating only its own frequency carrier spectras, such as a coordination of all three frequency carrier spectras by itself.

In one embodiment, after reception of the aforementioned first and second forward link carriers, 190, 194 by the MS 130, test information is then generated by the MS 130 regarding the suitability of these various forward link carriers. Specifically, the MS 130 determines the strength of the first or second forward link carrier 190, 194 by testing and performing quality control ("QC") checks, such as channel interference tests on the corresponding pilot channel of each forward link carrier. After performing these QC checks, the MS 130 then transmits this pilot channel QC information back to the first BTS 150 over a control channel. In a further embodiment, the MS 130 transmits the pilot channel QC information over the reverse link MAC channel of the first reverse link carrier 192 to the first BTS 150.

The aforementioned pilot channel QC information will then be stored in memory by the BTS 150, processed, compared to the pilot channel QC information of other forward link pilot channels, and then employed to select and coordinate an appropriate first or second forward link carrier or forward link carriers 190, 194 for a given "time-slot".

Employing time-slots for specified data channel use within a given forward link carrier, and then also employing various multiple forward link carriers within a given time-slot, instead of simultaneously transmitting data packets upon a plethora of orthogonal codes within a given single forward link carrier, channel interference ("C/I") can be reduced, thereby increasing an ultimate data-throughput rate of up to two or three times or more compared to that of the prior art. Time-slots may be predefined by synchronous timekeepers employed by the mobile station 130 and the first and second BTSs, 150 and 170, or some other means.

For the purposes of the present invention, determination or selection of a forward link carrier or carrier frequency spectra may also include the calculation and determination of relative data rates of transmission, encoding schemes, and so on, for a particular forward link carrier 190 or sets of forward link carriers 190. This determination is perhaps made by the DSP 155 by itself, or optionally with the aid of the DSP 175 of the second BTS 170. Alternatively, the determination of which forward link carrier to select may be made instead by a base transceiver station controller ("BSC") (not shown), with the DSP 155 simply utilizing the forward link carrier 190 in response to instructions from a BSC. Communication with either the second BTS 170 or the BSC, or both, may occur over the communication pathway 151.

Once a carrier frequency spectra within the first forward link carrier 190 is selected by the first BTS 150 as acceptable for data channel transmission, the first BTS 150 also then places a data channel assignment indicia within the selected forward link carrier 190 to be transmitted to the MS 130. Please briefly turn to FIG. 2, communication 260, for an example of the use of the data channel assignment indicia. The data channel assignment indicia indicates that the associated forward link carrier has been chosen for data packet transmission. In a further embodiment, the data channel assignment indicia is transmitted from the first BTS 150 to the MS 130 via a first forward link MAC channel associated with the selected first forward link carrier 190.

After transmission, the mobile station 130 monitors, either concurrently or consecutively, the forward link MAC channels of the various carriers frequencies contained within the first or second forward links, 190 and 192, respectively. The monitoring of the forward link MAC channels of the various frequency carriers by the mobile station 130 preferably occurs concurrently with the monitoring of the pilot channels of the same carriers by the mobile station 130.

Upon reception of the data channel assignment indicia upon a given forward link carrier, the mobile station 130 then receives data packets over an associated data channel within that forward link carrier during a given time-slot. In one embodiment, the identity of the carrier frequency spectra chosen for the transmission of data packets is sent over its corresponding forward link MAC channel.

For the purposes of illustration and clarity, only the first forward and first reverse link carriers 190, 192 are described in detail. However, it will be apparent that the explanation of carriers 190 and 192 also applies to the second forward and second reverse link carriers 194, 195, as well. It will also be apparent that the present invention could be practiced by employing either one of the cells 110, 120 or a number of similarly configured and functioning cells. It will be apparent that a single MS may be in communication with multiple BTSs, such as during a "soft handoff," as well as in other scenarios.

In a first embodiment, a "Class A" mobile station is employed as the MS 130. The Class A mobile station monitors the corresponding pilot channel of one of three forward link carriers or carrier frequencies in any given time-slot. This monitoring of a pilot channel may occur in a "round-robin" time-slot fashion, wherein one pilot channel is monitored in a particular time-slot. The Class A mobile station may either pick an initial forward link carrier at random, or by some other appropriate method. The Class A mobile station then performs pilot channel QC testing for such factors as strength of signal, level of background noise, etc., to create pilot channel QC information. The resulting pilot channel QC information generated for each received forward link carrier by the mobile station 130 is then transmitted serially to the first BTS 150 over the reverse link MAC channel for further comparisons and comparisons by the BTS 150. The reverse link MAC channel is typically a single reverse link carrier frequency spectra, perhaps chosen by the first BTS 150.

The Class A mobile station also monitors the corresponding forward link MAC channel of one of three forward link carriers in any given time-slot. This monitoring of a pilot channel may also occur in a "round-robin" time-slot fashion. After receiving the data channel assignment indicia, the Class A mobile station then receives data packets in the given time-slot over a data channel, the data channel specified by the forward link MAC channel. To reiterate the above, the reverse link carrier frequency spectra for a given carrier comprising the reverse link MAC channel may be specified by the first BTS 150. This specification may be sent over the forward link MAC channel. Generally, the Class A mobile station will monitor both the pilot channel and the forward link MAC channel of the same frequency carrier simultaneously for any given time-slot. The Class A mobile station monitors the pilot channel to create pilot channel control information for later use by the first BTS 150, and the Class A mobile station monitors the forward link MAC channel for the data channel assignment indicia.

A "Class B" mobile station may also be employed as the MS 130. The Class B mobile station also monitors both the corresponding pilot channel and the corresponding forward link MAC channel of the three forward link carriers. Class B mobile stations are capable of monitoring multiple carriers concurrently, as well as in the "round-robin" format of a Class A mobile station. As multiple pilot channels and forward link MAC channels may be monitored concurrently, the Class B mobile station also therefore tests and generates pilot channel QC information simultaneously, that is, in parallel, for multiple pilot channels. However, this pilot channel QC information corresponding to multiple pilot channels is still transmitted to the first BTS 150 in series, for reasons as will be described below.

Furthermore, as the Class B mobile station may also monitor multiple forward link MAC channels simultaneously, the Class B mobile station therefore also simultaneously monitors for multiple data channel assignment indicia sent over the multiple MAC channels. These multiple data channel assignment indicia are received over the various forward link MAC channels associated with the multiple forward link carriers. The Class B mobile station can therefore also simultaneously receive multiple data packets from the first BTS 150, or the first BTS 150 acting in coordination with the BTS 170. These data packets are transmitted over the separate data channels associated with the separate forward link carriers. In this configuration, use of time slots is optional.

However, the pilot channel QC information associated with each concurrently monitored forward link carrier or carrier frequency spectra is still transmitted serially over the reverse link MAC channel within the first reverse link carrier 192 to the first BTS 150. As transmitting this simultaneously derived pilot channel QC information serially to the first BTS 150 may overwhelm the "Class B" mobile station or create various processing bottle-necks at the BTS 150, a "best carrier" approach may instead be used.

In the "best carrier" approach, the Class B mobile station, either instead of or in addition to the previously referenced multiple pilot channel QC information, transmits the pilot channel QC information representing the "best" forward link carrier as determined by the Class B mobile station after examining the plurality of received pilot channels. The same or similar comparison is done as may be done by the first BTS 150, the BSC, etc. Alternatively, in situations wherein the pilot channel quality information of the various forward link carriers is relatively similar, the Class B mobile station may instead employ a combination or "hybrid" approach, wherein a statistical average of all of the pilot channel QC information associated with the various forward link carriers is transmitted to the first BTS 150 over the reverse link MAC channel. Similarly to a Class A mobile station, the frequency of the first reverse link carrier 192 used to convey the pilot channel QC information over the reverse link MAC channel may be specified by the first BTS 150.

Some form of identification, such as a forward link carrier ID ("CID") should also be used by the "Class B" mobile station when transmitting pilot channel QC information about a given forward link carrier. The CID may also be used by the Class A mobile station when transmitting pilot channel QC information in the "round robin" format. For example, the CID can be specified as one of the following: "01", "10", "11" for each given forward link carrier, or alternatively "00" may specify the pilot channel QC associated with the combination or "hybrid" carrier. Although three forward link carriers are disclosed in the present embodiment, the present invention should not be deemed limited to three forward link carriers, as the principles of the present invention should apply to a plurality of forward link carriers.

A "Class C" mobile station may also be employed as the MS 130. The Class C mobile station includes the functionality of the Class B mobile station. However, in contrast to the Class B mobile station, the bandwidth of the Class C mobile station reverse link MAC channel is substantially increased. The reverse link MAC channel may be a wideband reverse link MAC channel (e.g. 5 MHz). Employing the wideband reverse link MAC channel of the Class C mobile station allows a substantial increase of simultaneously transmitted QC information of multiple transmitted pilot channels to be transmitted to the first BTS 150. Employing the wideband reverse link MAC channel could perhaps encompass conveying the QC information of multiple pilot channels generated simultaneously by the "Class C" mobile station.

As alluded to previously, after receiving pilot channel QC information associated with the forward link carrier 190 generated by the MS 130, (whether the MS 130 is a Class A, a Class B, a Class C, or some other embodiment of a mobile station) the first BTS 150 then determines upon which frequency carrier within the forward link carrier 190 is to be employed. As mentioned previously, separate carrier frequencies within the forward carrier link 190 may be generated simultaneously by the first BTS 150. Separate carrier frequencies may each have their own data packets impressed upon them. The transmission of data packets within a data channel of the first forward link carrier 190 is performed in a time-slot fashion, with preferably not more than one or two orthogonal codes employed within a carrier at any one time. However, the present invention should not be deemed as limited to two or more orthogonal codes.

However, there may be instances wherein there may be more than one or two orthogonal codes that are employed during a given time-slice, depending upon the particular situation. Also, there may be some channels, perhaps data channels, perhaps not, that may be employed in a continuous manner, that is to say, not in a time-sliced manner.

As mentioned above, in spread-spectrum transmission and reception, it is often advantageous to have a minimum or reduced amount of C/I within a given forward link carrier. The aforementioned time-slot of a data channel transmissions within each separate forward link carrier. With a minimalization or reduction of C/I, efficiencies may occur when the first BTD 150 then sends the data packet to the MS 130 over the forward link carrier through a given data channel. For the purposes of determining upon which forward link carrier the packet data should be sent, the BTS 150 should therefore have access to pilot channel QC information for any particular forward link carrier considered.

To reiterate the above, the MS 130, either as a Class A mobile station, Class B mobile station, Class C mobile station, or some other form of mobile station, transmits pilot channel QC information associated with the various forward link carriers or carrier frequencies. This information is such information as is associated with the corresponding QC pilot channels of the forward link carrier frequencies. Using this received pilot channel QC information concerning the multiple pilot channels, the first BTS 150 will then determine which forward link carrier or forward link carriers to employ for transmission of the data packets to the MS 130. One or more factors to be considered in allocating the various data packets to the various selected forward link carriers could include such considerations as enabling maximum total information throughput, greater signal robustness, quality of service, grade of service, and so on.

Figure 2:
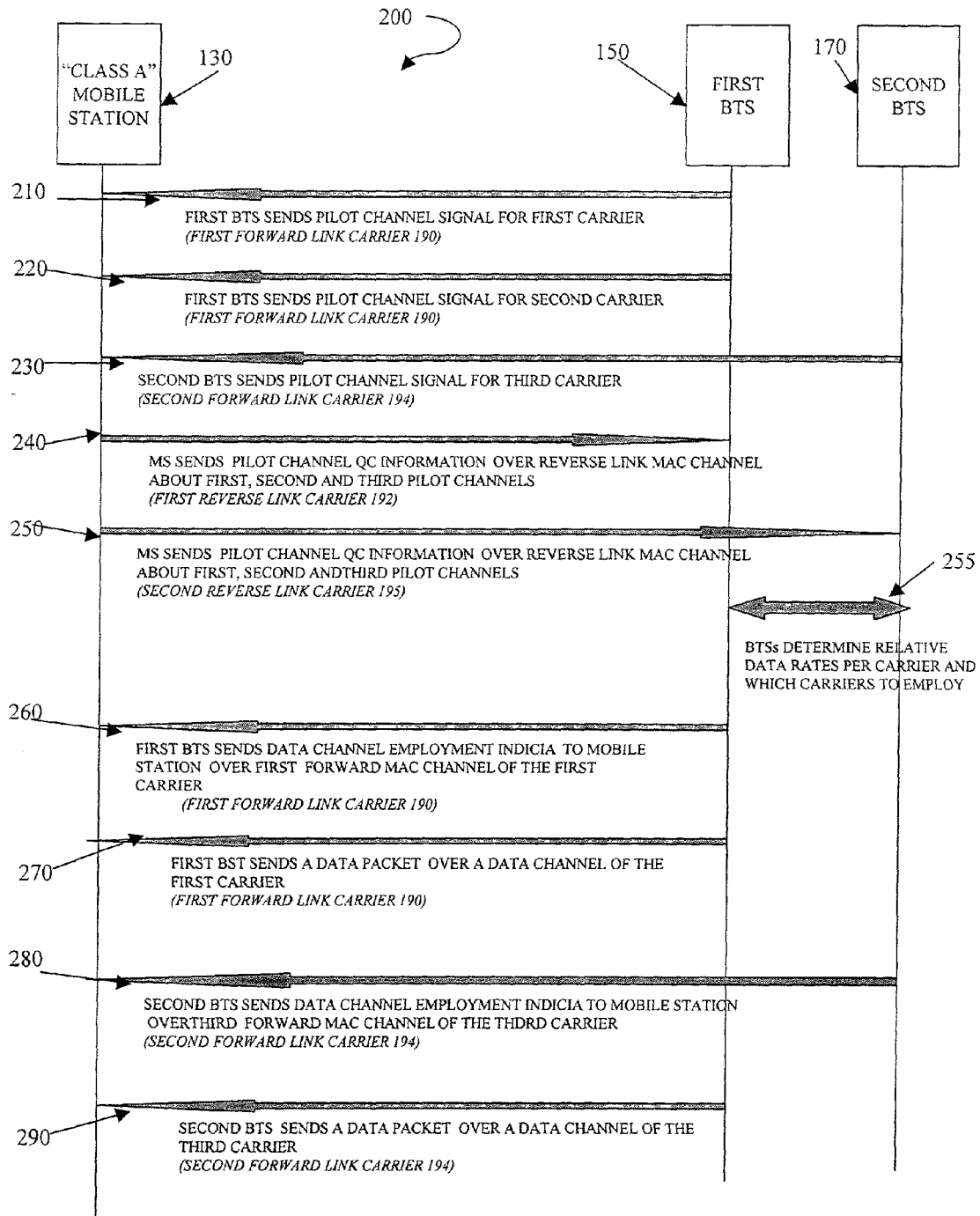
FIG. 2 illustrates an event diagram illustrating the sequence of signals between the nodes of a communication system of FIG. 1.

Turning now to FIG. 2, disclosed is one preferred event diagram 200 of one timing relationships between a Class A mobile station 130, a first BTS 150 and a second BTS 170 of the data packet communications system 100. Although the timing relationships disclosed in FIG. 2 apply to one embodiment of the Class A mobile station, similar timing relationships may apply by analogy to the Class B mobile station, the Class C mobile station, or other implementations and embodiments of the Class A mobile station.

As illustrated in FIG. 2, in communication step 210 the present embodiment, the first BTS 150 sends a pilot channel signal over the first forward link carrier 190. Then, in communication step 220, the first BTS 150 sends a second pilot channel signal on a carrier of a differing frequency, also over the first forward link carrier 190. Finally, in communication step 230, the second BTS 170 sends a third pilot channel signal over the second forward link carrier 194, the third carrier having yet a third frequency. This allocation of carriers could be the result of the physical proximity of the Class A mobile station 130 to the base stations 150, 170 and characteristics of local signal propagation at differing frequencies.

The Class A mobile station 130 then monitors these first, second, and third pilot channels of the first and second forward links, 190, 194, respectively, for QC purposes. More specifically, the Class A mobile station 130 generates test data, called pilot channel test information, about these three pilot channels. These pilot channels have typically been monitored in a "round-robin" format, one monitor of pilot channel per time-slot. Also, please note that, in other embodiments, the three pilot channels might be continuously transmitting.

Then, in the communication 240, the Class A mobile station sends the pilot channel QC information associated with the three pilot channels over the first reverse link carrier 194 to the first BTS 150 using its associated reverse link MAC channel. The Class A mobile station 130, in communication step 250, also sends the pilot channel QC information associated with the three pilot channels over the second reverse link carrier 194 to the second BTS 170 using its associated reverse link MAC channel. Note that it may be possible for the Class A mobile station 130 to transmit to both of the BTSs 150, 170 on the same reverse link carrier frequency spectra simultaneously.

Both of the BTSs 150, 170 monitor their respective reverse link MAC channels so as to extract the embedded pilot channel QC information. In communication 225, the BTSs 150, 170 jointly determine and select which of the differing frequency carriers of the first and second forward link carriers 190, 194 are to be utilized for the purpose of conveying data packets. The BTSs will also calculate relative data speeds for the various carriers, etc.

In the present example, in communication 255, the BTSs 150, 170 determine, perhaps with the aid a high-level switch such as a mobile station controller, to employ two carrier spectra or frequencies for the transmission of data packets: one carrier or carrier spectra frequency from the first BTS 150 (carrier 1) sent over the first forward link carrier 190 and a second carrier spectra or frequency sent over the second forward link carrier 194 from the second BTS 170 (carrier 3). Please note, however, that in other embodiments of the present invention, the communication 255 need not occur, as there is only the first BTS 150 coordinating its own carrier frequency spectrums.

Therefore, in communication 260, the first BTS 150 sends a data channel assignment indicia over a forward link MAC channel of the corresponding carrier of the first forward link 190. Employment of the data channel assignment indicia generally indicates that the BTS 150, 170 has selected the corresponding carrier's data channel to convey the data packet or data packets through its data channels.

In communication 270, the first BTS 150 then sends the corresponding data packet or packets over the data channel of a carrier associated with the first forward link 190 during a given time-slot. Meanwhile, the Class A mobile station is monitoring the forward link MAC channel of a given carrier for a possible data channel assignment indicia. If the data channel assignment indicia is detected by the Class A mobile station, as it is in the present illustration, the "Class A" mobile station then starts to receive the data packet or data packets over a data channel of a carrier of the first forward link carrier 190.

After receiving data packets from the first data channel during a given time-slot, the Class A mobile station 130 then monitors the second pilot channel associated with the second carrier of the first forward link carrier 190. In the present embodiment, concurrently with monitoring the forward link MAC channel, the Class A" mobile station 130 also monitors the associated pilot channel to generate pilot channel QC information to be transmitted in the next iteration of communication 230.

To repeat the above, a determination may then made jointly by the first BTS 150 and the second BTS 170 in the communication 255 as to whether or not to select the second frequency carrier of the first forward link carrier 190 for the purpose of conveying data packets for a given time-slot, based upon the pilot channel QC information received over the reverse link MAC channel. Although other information may be transmitted through the forward link MAC channel, as this determination to transmit data over the second carrier frequency spectra during this time-slot is a negative, no data channel assignment indicia is generated or transmitted by the BTS 150. Although the examples are shows with the two BTSs communicating, other preferred embodiments may have only a single BTS.

In the present example, the second frequency carrier will not be employed, so no data channel assignment indicia is sent. Therefore, the Class A mobile station 130 will not receive a data channel assignment indicia, so the Class A mobile station will then monitor the third forward link MAC channel for a data channel assignment indicia instead. The Class A mobile station 130 then again also tests the associated pilot channel to generate pilot channel QC information to be transmitted in the next iteration of communication 230.

Meanwhile, the Class A mobile station monitors the second forward link MAC channel, finds that there is no data channel assignment indicia generated for this carrier frequency spectra at this time-slot, and thereafter determines that no data packets are presently forthcoming on the associated second data channel. Therefore, the Class A mobile station does not configure itself to receive any data packets over the data channel of frequency carrier two.

In communication 280, the second BTS 170 then sends an employment carrier flag to the Class A mobile station over the third forward link MAC channel. This forward link MAC channel is in the third frequency or spectrum, and is transmitted over the second forward link carrier 194. After transmitting the data channel assignment indicia to denote that the associated third carrier frequency spectra is to be employed for the given time-slot in communication step 280, in communication step 290, the second BTS 170 then sends packet data over the associated data channel to the Class A mobile station. The Class A mobile station 130 then again may also tests the associated pilot channel to generate pilot channel QC information to be transmitted in the next iteration of communication 230.

Although in the illustrated embodiment of FIG. 2, the monitoring of the various pilot channels and the monitoring of the various forward link MAC channels by the Class A mobile station are sequential to one another, in other embodiments, the monitoring of the pilot channels and the monitoring of the forward link MAC channels may be performed independently of one another, with no exact correlation of timing requirements necessary. Also, to reiterate the above, the pilot channel QC information associated with the plurality of the carriers may be considered by the BTSs 150, 170 not just the three carriers referenced above. Also, a Class B mobile station, a Class C mobile station, or some other mobile station, may be used.

Figure 3A:
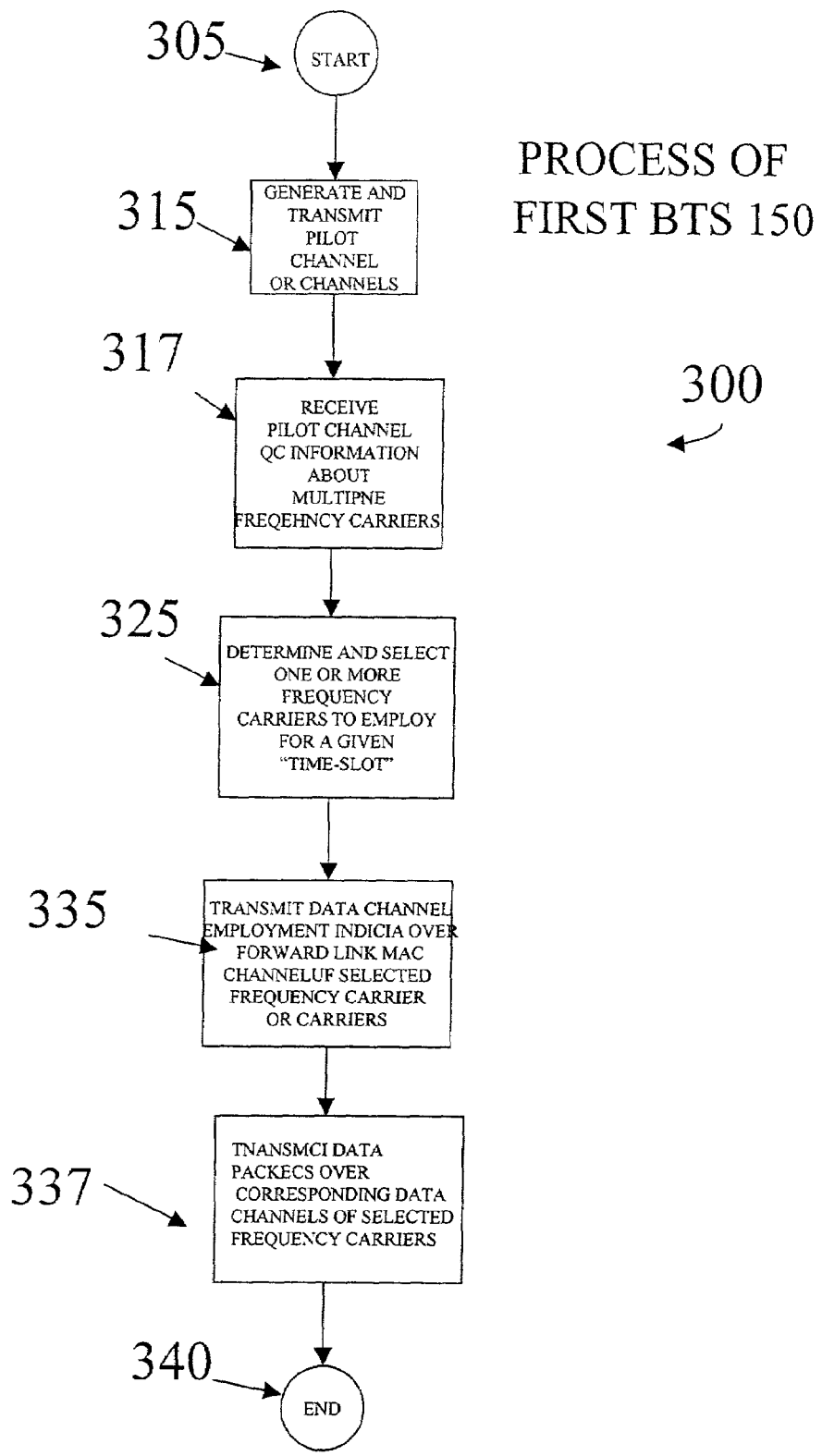
FIG. 3A illustrates method steps employed by a base transceiver station in assigning carriers and data channels in the communications system of FIG. 1.

Turning now to FIG. 3A, disclosed is one sequence of events associated with the operation of the first BTS 150 of the data packet communication system 100.

Within a base station flowchart 300, after a start step 305, in step 315, the first BTS 150 generates and transmits a pilot channel or pilot channels associated with the various candidates carriers within the first forward link 190. After the Class A mobile station monitors and tests the pilot channel or pilot channels associated with the various candidate carrier frequencies of both the first BTS 150 and the second BTS 170, a copy of all of the resulting pilot channel QC is then received by the first BTS in the step 317.

Then, in step 325, the pilot channel QC information is processed by the first BTS 150 (perhaps in collaboration with the second BTS 170) to determine and select which carriers to employ for conveying the data packets of the first and second forward links 190, 195, respectively, in a given time-slot.

After step 325, after the above selection has occurred in step 335, a data channel assignment indicia may be transmitted from the first BTS 150 over the forward link MAC channel corresponding to any selected carriers of the first forward link carrier 190. (A data channel assignment indicia may be transmitted from the second BTS 170 over the forward link MAC channels corresponding to any of the selected carriers of the second forward link carrier 195.)

Then, in step 337, the first BTS 150 transmits the data packet or data packets over the selected frequency carriers of the first forward link channel through the data channel. One basis of selection may be the to identify more than one MS 130. Afterwards, an end step 340 is executed, stopping the flow.

Figure 3B:
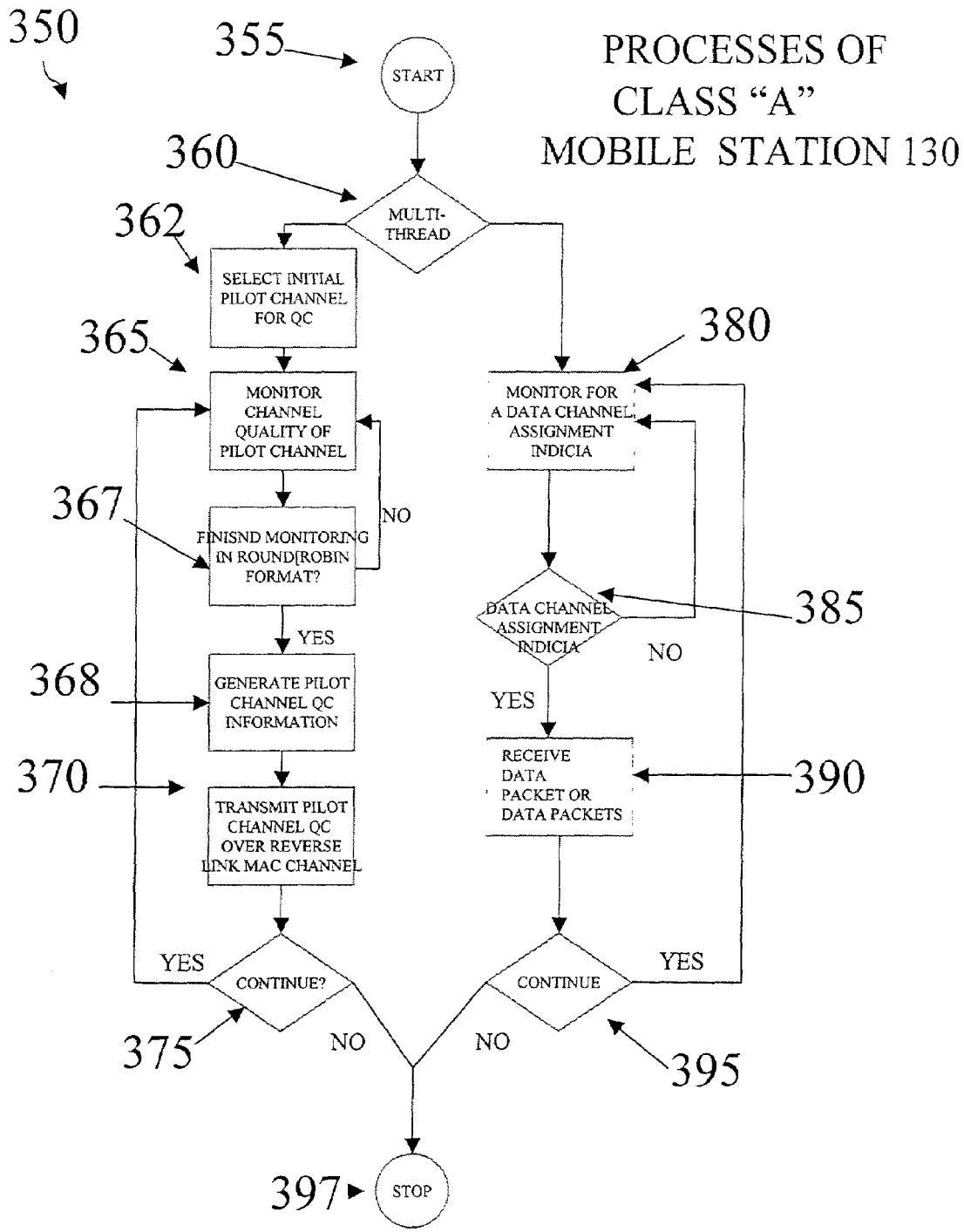
FIG. 3B illustrates method steps employed by a mobile station in receiving carriers and data channels in the communications system of FIG. 1.

Turning now to FIG. 3B, disclosed is a sequence of events associated with the reception of a pilot channel by a Class A mobile station 130, the generation and transmission of associated pilot channel QC information over a reverse link MAC channel by the Class A mobile station 130, and also further is disclosed a sequence of events pertaining to the reception by the Class A mobile station 130 of the data channel assignment indicia over a forward link MAC channel and the reception of data packets over the corresponding data channel.

Within a Class A mobile station flowchart 350, after executing a start step 355, a multi-thread step 310 is executed. The multi-thread step 310 initiates two different processes: that of the Class A mobile station 130 selecting a pilot channel to monitor, perhaps randomly, in a selection step 362, and that of the Class A mobile station 130 monitoring for a data channel assignment indicia on the forward link MAC channel in step 380. The monitoring steps of these two different processes preferably monitor the same frequency carrier at the same time.

Concerning the first process: after the selection step 362, the mobile station then monitors the selected pilot channel for QC purposes in a pilot channel monitor step 365 for any given time-slot. Then, in step 367, the Class A mobile station 130 determines whether there are any more frequency carriers to monitor for the given set of time-slots. If there are more frequency carriers to monitor, then the Class A mobile station 130 re-executes step 365. If there are no more frequency carriers to monitor, then the Class A mobile station 130 then executes step 368. In step 368, the pilot channel QC information is generated concerning the pilot channels of the various carriers.

In step 370, this QC pilot channel information concerning the various pilot channels is then transmitted to the first BTS 150 (and perhaps the second BTS 170) over a specified reverse link MAC channel or channels. After transmitting the pilot channel QC information to the first BTS 150, a continue step 375 is executed. If no more pilot channel QC information is desired to be generated, then a stop step 397 is executed. However, if more pilot channel QC information is desired to be generated concerning the various pilot channels, then step 365 is once again executed.

Concerning the second process: after executing the step 380 of data channel assignment indicia monitoring over a given forward link MAC carrier, in step 385 a determination is made as to whether a data channel assignment indicia has actually been received. If no data channel assignment indicia has been received by the Class A mobile station 130 in the specified manner for a given "time-slot", step 380 is again executed by the step 385.

However, if the data channel assignment indicia has been received for a particular frequency carrier, as determined by step 385, in a receive data packet step 390, the Class A mobile station 130 then receives a data packet or requisite number of data packets over the associated data channel of the corresponding frequency carrier for a given time-slot. After receiving the data packet or data packets from the first BTS 150 in step 390, step 395 is executed. If no more time-slots are to be used by the mobile station for data packet transfer, then stop step 397 is executed. Otherwise, if more data packets are desired to be received in further time-slots, then step 380 is once again executed.

Figure 4A:
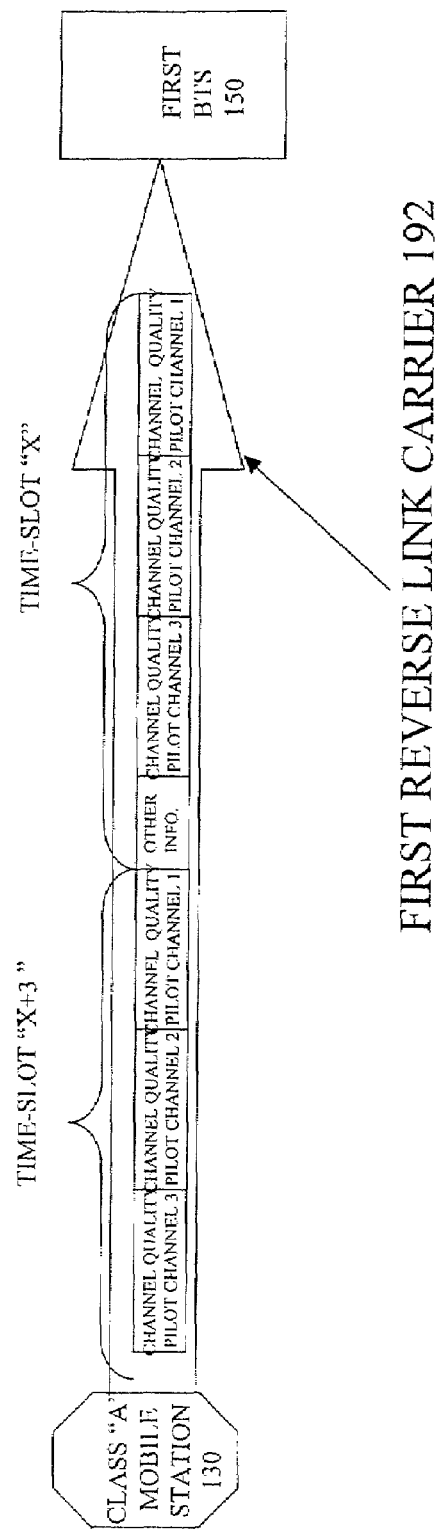
FIG. 4A illustrates a stream of pilot channel QC information transmitted over a reverse link MAC channel.

Turning to FIG. 4A, disclosed is a detailed example of a bit stream transmitted through a reverse link MAC channel, referenced in communication 250 of FIG. 2. In FIG. 4A, the Class A mobile station 130 serially transmits the previously generated pilot channel QC information of three separate pilot channels to the first BTS 150 during a single time-slot, time-slot "X". As the reverse link MAC channel is used also to convey other information from the Class A mobile station 130 as well, this information is generally designated as the "other info." box. As detailed in communication 250, the reverse link MAC channel would be contained within the first reverse link carrier 192.

Then, three time-slots later, more pilot channel QC information of three separate pilot channels is transmitted back to the first BTS 150. This generally represents a "round-robin" monitoring of the pilot channels, with one time-slice allotted to one carrier. Alternately, the pilot channel QC information for each carrier frequency spectra may each be transmitted per time-slot.

Figure 4B:
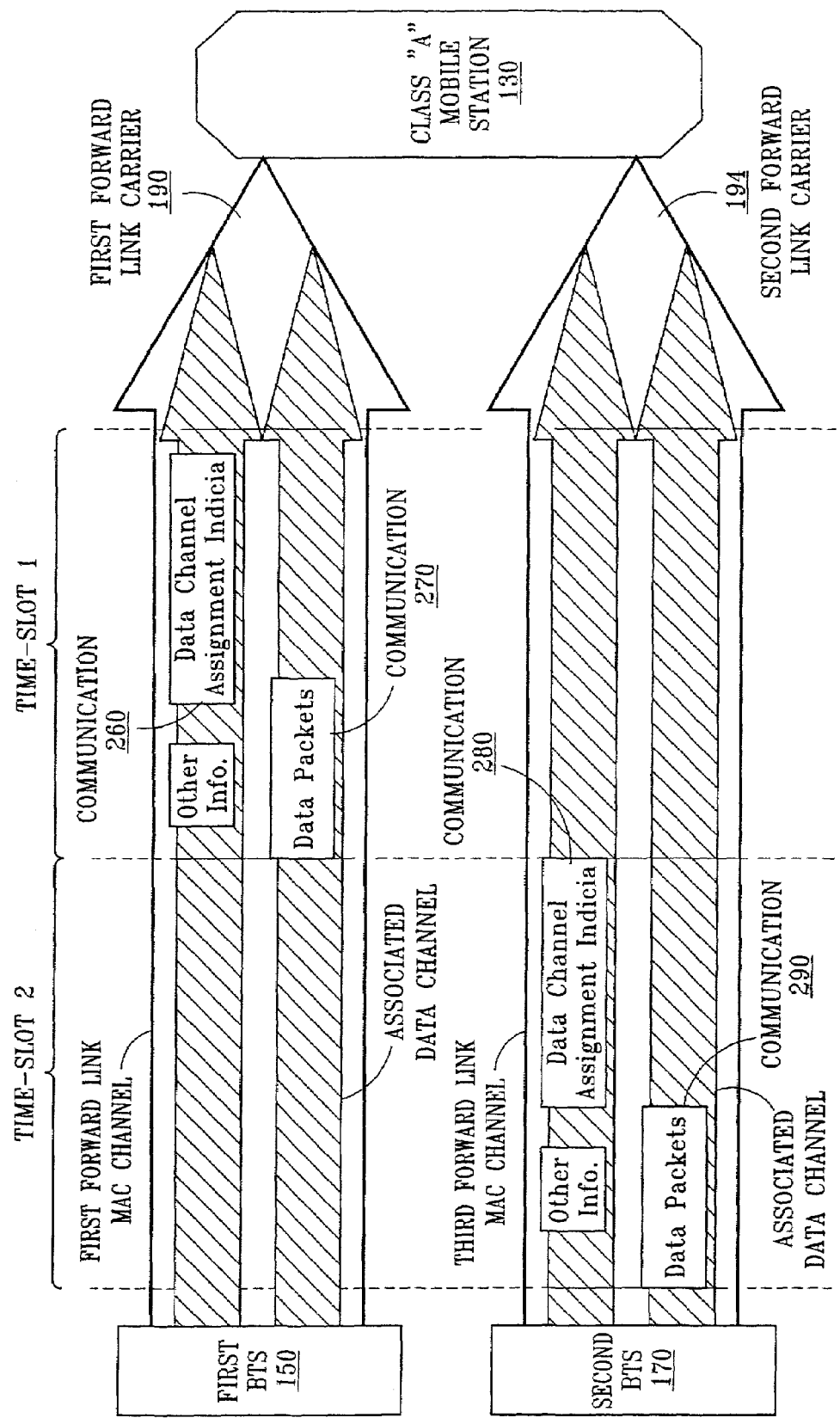
FIG. 4B illustrates streams of data channel assignment indicia and data packets over a first and second forward link carrier.

Turning to FIG. 4B, disclosed is a detailed example of the transmittance of data channel assignment indicia and data packets from the first BTS 150 and the second BTS 170 to the Class A mobile station 130, referenced in communications 260, 270, 280 and 290 of FIG. 2. In the present embodiment, each of the illustrated selected forward link carriers has a forward link MAC channel which in turn conveys a data channel assignment indicia. The data channel assignment indicia for a given forward link carrier is then followed by a data packet or data packets on the associated data channel.

In FIG. 4B, both the first BTS 150 and the second BTS 170 each transmit during a separate time-slot. In time-slot 1, the first BTS 150 sends the data channel assignment indicia over the first forward link MAC channel to the Class A mobile station 130 in communication 260. This indicates to the Class A mobile station 130 that a data packet or data packets are also coming in time-slot 1, in communication 270. As the forward link MAC channel is used to convey other information to the Class A mobile station 130 as well, this information is also generally designated as the "other info." box. As detailed in communication 260, the forward link MAC channel would be contained within the first forward link carrier 190.

Afterwards, in time-slot 2, another data channel assignment indicia is sent, this time over the third forward link MAC channel, in communication 280. This data channel assignment indicia is then received by the Class A mobile station 130. The Class A mobile station 130 then receives the data packets over the associated data channel in the communication 290. Both communication 280 and 290 are received over the second forward link carrier 194.

In further embodiments of the present invention, there may be multiple selected carriers employed for data transmission over the various data channels. This is acceptable, as the separate data channels within separate forward link carriers should not interfere with one another unduly. Furthermore, the mobile station, especially a Class B mobile station or a Class C mobile station, should be able to discriminate among substantially simultaneous transmissions of data packets upon multiple forward link carriers by the nature of their respective abilities to monitor more than one forward link carrier concurrently.

By the use of the present invention, data may be transmitted more efficiently to a mobile station user or mobile station users to thereby attain a higher system throughput in high-speed data systems than is possible using conventional technology.

It is understood that the present invention may take many forms and embodiments. Accordingly, several variations may be made in the foregoing without departing from the spirit or the scope of the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A first base transceiver station to broadcast data packets, comprising:
    at least one receiver, the receiver to receive a QC signal over a reverse link MAC channel, the QC signal indicating forward link pilot channel quality;
    at least one digital processor, the digital processor to cooperate with the receiver of the first base transceiver station and a second base transceiver station and to select one of a plurality of forward link carriers based upon one of a plurality of the QC signals associated with the forward link pilot channel; and
    at least one transmitter, the transmitter to transmit a data channel assignment indicia to a mobile station over a corresponding forward link MAC channel.

2. The first base transceiver station of claim 1, wherein the QC signal is associated with the quality of a plurality of forward link pilot channels, the QC signal encapsulated in a round-robin format.

3. The first base transceiver station of claim 1, wherein a mobile station is configurable to monitor a plurality of forward link MAC channels simultaneously.

4. The first base transceiver station of claim 1, wherein the base transceiver station is configurable to transmit a plurality of forward link MAC channels simultaneously.

5. The first base transceiver station of claim 1, wherein the base transceiver station is configurable to receive a transmission of the simultaneous comparison of the quality of a plurality of forward link pilot channels over the reverse link MAC channel.

6. The first base transceiver station of claim 1, wherein the base transceiver station is configurable to receive a value representing a statistical average of the quality of a plurality of forward link pilot channels.

7. The first base transceiver station of claim 1, wherein the base transceiver station is configurable to receive a value representing a preferred forward link pilot channel.

8. The first base transceiver station of claim 1, wherein the base transceiver station is configurable to receive simultaneous separate transmissions of information associated with the quality of a plurality of pilot channels.

9. A broadcast system for transmitting data packets, comprising:
   a plurality of forward link carriers, wherein each member of the plurality of forward link carriers has a forward link MAC channel employable to convey a data channel assignment indicia, each member of the plurality of forward link carriers further having a forward link pilot channel; and
   a receiver for receiving a reverse link carrier having a reverse link MAC channel, wherein the reverse link MAC channel is employable to convey a QC signal associated with the quality of the forward link pilot channels, wherein the QC signal is encapsulated in a round-robin format.

10. The broadcast system of claim 9, wherein a base system controller determines a forward data link carrier based upon the QC signal.

11. The broadcast system of claim 9, wherein the data packets are transmitted by a base transceiver station.

12. The broadcast system of claim 11, wherein the base transceiver station is configurable to transmit a plurality of forward link MAC channels simultaneously.

13. The broadcast system of claim 11, wherein the base transceiver station is configurable to receive a transmission of the simultaneous comparison of the channel quality of a plurality of forward link pilot channels over the reverse link MAC channel.

14. The broadcast system of claim 11, wherein the base transceiver station is configurable to receive an averaged QC signal representing a statistical average of the quality of a plurality of forward link pilot channels.

15. The broadcast system of claim 11, wherein the base transceiver station is configurable to receive a value representing a preferred forward link pilot channel.

16. The broadcast system of claim 11, wherein the base transceiver station is configurable to receive simultaneous separate transmissions of QC signals, each separate QC signal associated with one of a plurality of separate forward link carriers.

17. A method for broadcasting data packets from a first base transceiver station or a second base transceiver station over a plurality of forward link data carriers, the method comprising:
   receiving a QC signal over a reverse link MAC channel, the QC signal indicating forward link pilot channel quality;
   selecting a forward link carrier based upon the QC signal by cooperating with first base transceiver station and the second base transceiver station; and
   transmitting a data channel assignment indicia over the corresponding forward link MAC channel.

18. The method of claim 17, wherein the QC signal is associated with the channel quality of a plurality of forward link pilot channels, the QC signal encapsulated in a round-robin format.

19. The method of claim 17, further comprising a step of a mobile station monitoring a plurality of forward link MAC channels simultaneously.

20. The method of claim 17, wherein the step of transmitting further comprises the base transceiver station transmitting a plurality of forward link MAC channels simultaneously.

21. The method of claim 17, wherein the step of receiving further comprises receiving a simultaneous comparison of the quality of a plurality of forward link pilot channels over the reverse link MAC channel.

22. The method of claim 17, wherein the step of receiving further comprises receiving a value representing a statistical average of the quality of a plurality of forward link pilot channels.

23. The method of claim 17, wherein the step of receiving further comprises receiving a value representing a preferred forward link pilot channel.

24. The method of claim 17, wherein the step of receiving further comprises receiving simultaneous separate transmissions of QC signals, wherein each separate QC signal is associated with one of a plurality of separate forward link pilot channels.

25. A base transceiver station to broadcast data packets, comprising:
   a receiver, the receiver to receive a QC signal over a reverse link MAC channel, the QC signal indicating the quality of a plurality of forward link pilot channels, wherein the QC signal is encapsulated in a round-robin format;
   a digital processor, the digital processor to select one of a plurality of forward link carriers based upon one of a plurality of the QC signals associated with the forward link pilot channel; and
   a transmitter, the transmitter to transmit a data channel assignment indicia to a mobile station over a corresponding forward link MAC channel.

* * * * *